(12) United States Patent
Lin et al.

(10) Patent No.: US 10,887,483 B2
(45) Date of Patent: Jan. 5, 2021

(54) MULTIFUNCTIONAL AUTOMATIC QUALITY INSPECTION MACHINE AND CONTROL METHOD THEREOF

(71) Applicant: Guangzhou Pulisi Technology Co., Ltd., Guangdong (CN)

(72) Inventors: Xiaobo Lin, Guangdong (CN); Lu Liu, Guangdong (CN)

(73) Assignee: Guangzhou Pulisi Technology Co., Ltd., Guangzhou (CN)

( * ) Notice: Subject to any disclaimer, the term of this patent is extended or adjusted under 35 U.S.C. 154(b) by 94 days.

(21) Appl. No.: 16/389,944

(22) Filed: Apr. 20, 2019

(65) Prior Publication Data

US 2020/0177750 A1 Jun. 4, 2020

(30) Foreign Application Priority Data

Nov. 30, 2018 (CN) .......................... 2018 1 1452828

(51) Int. Cl.
*H04N 1/00* (2006.01)
*G01N 21/89* (2006.01)
(Continued)

(52) U.S. Cl.
CPC ..... *H04N 1/00676* (2013.01); *G01N 21/8901* (2013.01); *G01N 21/892* (2013.01);
(Continued)

(58) Field of Classification Search
CPC ........... H04N 1/00676; H04N 1/00005; H04N 1/00042; H04N 1/00082; G01N 21/8901; G01N 21/892; G01N 21/8914; G01N 2021/8917; G06F 3/1204; G06F 3/1256; G06T 7/0004; G06T 2207/30144; B65H 18/103; B65H 75/242; B65H 2701/19; B26D 1/245; B26D 7/015; B26D 7/27; B41F 33/0036
See application file for complete search history.

(56) References Cited

U.S. PATENT DOCUMENTS

5,682,473 A * 10/1997 Carson ................ G06F 11/3604
714/38.1
6,185,001 B1 * 2/2001 Webendorfer ......... G06K 15/00
347/19
(Continued)

*Primary Examiner* — John B Strege (57) ABSTRACT

The present invention has disclosed a multifunctional automatic quality inspection machine and a control method thereof. The machine comprises a frame, an unrolling device provided at the frame, an inspection mechanism, a button operating platform, a slitting mechanism, a main controller, a display device, and a rolling device; a paper movement route is provided between the unrolling device and the rolling device; the inspection mechanism and the display device are respectively electrically connected to the main controller; the rolling device includes a first rolling airshaft, a second rolling airshaft, and a rolling drive device; the first rolling airshaft and the second rolling airshaft are provided on the rolling drive device; the first rolling airshaft and the second rolling airshaft swap their positions via the rolling drive device. The machine has a number of functions including automatic unrolling, high inspection precision, discharging waste materials, splitting and quick rolling.

20 Claims, 2 Drawing Sheets

(51) Int. Cl.
  *G01N 21/892* (2006.01)
  *G06F 3/12* (2006.01)
  *G06T 7/00* (2017.01)

(52) U.S. Cl.
  CPC .......... *G06F 3/1204* (2013.01); *G06F 3/1256* (2013.01); *G06T 7/0004* (2013.01); *H04N 1/00005* (2013.01); *H04N 1/00042* (2013.01); *H04N 1/00082* (2013.01); *G06T 2207/30144* (2013.01)

(56) References Cited

U.S. PATENT DOCUMENTS

| | | | |
|---|---|---|---|
| 2011/0231008 A1* | 9/2011 | McIntee | G07B 17/00459 |
| | | | 700/222 |
| 2014/0117084 A1* | 5/2014 | Wooldridge | G06K 7/0013 |
| | | | 235/375 |
| 2017/0232770 A1* | 8/2017 | Akiyama | G01N 21/84 |
| | | | 347/51 |
| 2017/0249380 A1* | 8/2017 | Hosokawa | G06F 8/70 |
| 2019/0224963 A1* | 7/2019 | Numauchi | G01N 21/8806 |
| 2020/0072759 A1* | 3/2020 | Kawai | H04N 1/00039 |
| 2020/0223574 A1* | 7/2020 | Tong | B65B 57/04 |

* cited by examiner

MULTIFUNCTIONAL AUTOMATIC QUALITY INSPECTION MACHINE AND CONTROL METHOD THEREOF

CROSS-REFERENCE TO RELATED APPLICATIONS

The present application claims the benefit of Chinese Patent Application No. 201811452828.5 filed on Nov. 30, 2018. The contents of the above are hereby incorporated by reference.

FIELD OF THE INVENTION

The present invention relates to the technical field of inspection devices and in particular involves a multifunctional automatic quality inspection machine and a control method thereof.

BACKGROUND OF THE INVENTION

In the printing of rolls of different media, printing defects frequently occur. Therefore, quality management is crucial; quality inspection is the most important aspect of quality management. At present, when using a semi-multifunctional automatic quality inspection machine, quality inspection is carried out at high speeds due to efficiency requirements. The roll-type products under inspection move too quickly for human eyes to clearly judge their printing quality. As a result, printing defects and inaccurate positioning during printing cannot be corrected promptly, resulting in poor printing quality. This affects the quality of the printing products and increases printing costs. In addition, traditional quality inspection machines are configured to carry out only one function. They are not highly automatic, and the rolling and replacement of materials are demanding. These factors give rise to a lot of inconvenience in production.

SUMMARY OF THE INVENTION

In view of the above, the objective of the present invention is to provide a multifunctional automatic quality inspection machine and a control method thereof, the multifunctional automatic quality inspection machine has a number of functions, is highly automatic, can effectively improve inspection precision and production efficiency, and can automatically replace materials.

The technical solution of the present invention is:

A multifunctional automatic quality inspection machine, which comprises a frame, an unrolling device provided at the frame, an inspection mechanism, a button operating platform for removing a defective roll-type printing product, a slitting mechanism, a main controller, a display device, and a rolling device; a paper movement route is provided between the unrolling device and the rolling device; the inspection mechanism, the button operating platform, and the slitting mechanism are provided at the paper movement route along a paper movement direction; a number of guiding rollers are provided along the paper movement route;
the inspection mechanism includes a camera for photographing a roll-type printing product, a light source for assisting the camera, and a case; the camera and the light source are provided in the case; the case and the paper movement route correspond to each other; the inspection mechanism and the display device are respectively electrically connected to the main controller; the rolling device includes a first rolling airshaft, a second rolling airshaft, and a rolling drive device; the first rolling airshaft and the second rolling airshaft are both provided on the rolling drive device; the first rolling airshaft and the second rolling airshaft swap their positions via the rolling drive device.

In the multifunctional automatic quality inspection machine described above, the camera and the light source are provided in the case; the case and the paper movement route correspond to each other; the inspection mechanism and the display device are electrically connected to the main controller respectively. Via these settings, the inspection mechanism has a three-dimensional light source system, which gives rise to wider applications in defect detection. The first rolling airshaft and the second rolling airshaft are both provided on the rolling drive device; during material replacement, the first rolling airshaft or the second rolling airshaft can be installed with a paper core. The drive device allows switching, which automatically transfers the second rolling airshaft or the first rolling airshaft to the position corresponding to the paper movement route. This allows the quick material collection and quick replacement of roll-type printing products by the rolling device, increasing productivity. In addition, the frame is sequentially provided with the unrolling device, the inspection mechanism, the button operating platform, the slitting mechanism, and the rolling device. The unrolling device and the rolling device could automatically unroll and roll. The inspection mechanism could inspect at a high precision. The button operating platform replaces defective roll-type printing products. The slitting mechanism divides roll-type printing products into two parts or a number of parts. These features of the multifunctional automatic quality inspection machine bring a number of advantages including high automation level, high inspection precision, high inspection efficiency and multi-functional. The multifunctional automatic quality inspection machine removes the need for extensive manual operation and has high production efficiency.

In one embodiment of the present invention, the rolling drive device includes a turntable and a motor; the motor is connected to the turntable and drives the turntable to rotate; the first rolling airshaft and the second rolling airshaft are respectively provided on the turntable; the first rolling airshaft and the second rolling airshaft swap their position via rotation of the turntable driven by the motor.

In one embodiment of the present invention, the first rolling airshaft and the second rolling airshaft are symmetrically provided at two ends of a diameter of the turntable.

In one embodiment of the present invention, the turntable further includes a first air source switch electrically connected to the first rolling airshaft and a second air source switch electrically connected to the second rolling airshaft.

In one embodiment of the present invention, the slitting mechanism includes an incoming feed guiding roller, an upper cutter mechanism, a lower cutter mechanism, and an outgoing feed guiding roller; the upper cutter mechanism is located above the lower cutter mechanism; both the upper cutter mechanism and the lower cutter mechanism have an eccentric self-locking structure; the incoming feed guiding roller and the outgoing feed guiding roller are provided on both sides of the upper cutter mechanism and the lower cutter mechanism.

In one embodiment of the present invention, the upper cutter mechanism includes an upper cutter shaft and a slitting upper cutter; the lower cutter mechanism includes a lower cutter shaft, a slitting lower cutter, and a lower cutter motor which is connected to the lower cutter shaft and drives rotation of the lower cutter shaft; the lower cutter shaft meshes with the upper cutter shaft; the lower cutter motor drives the lower cutter shaft to rotate and to move close to or away from the upper cutter shaft.

In one embodiment of the present invention, the frame further includes a first traction device and a second traction device; the first traction device is disposed between the inspection mechanism and the button operating platform; the second traction device is disposed between the button operating platform and the slitting mechanism.

In one embodiment of the present invention, the first traction device includes a first traction shaft, a first paper pressing rubber roller, and a first cylinder which is connected to and drives the first paper pressing rubber roller; the first cylinder drives the first paper pressing rubber roller to be in contact with or move away from the first traction shaft; the second traction device includes a second traction shaft, a second paper pressing rubber roller, and a second cylinder which is connected to and drives the second paper pressing rubber roller; the second cylinder drives the second paper pressing rubber roller to be in contact with or move away from the second traction shaft.

In one embodiment of the present invention, the frame further includes a first corrector and a second corrector; the first corrector is disposed between the unrolling device and the inspection mechanism; the second corrector is disposed between the button operating platform and the slitting mechanism.

In one embodiment of the present invention, the display device is provided directly above the button operating platform.

In one embodiment of the present invention, the button operating platform includes an operation button which is electrically connected to the main controller.

In one embodiment of the present invention, the frame further comprises a human-computer operating system; the human-computer operating system is electrically connected to the main controller.

In one embodiment of the present invention, the frame is provided with a signal light which is signally connected to the main controller.

The present invention also provides a control method for the multifunctional automatic quality inspection machine, which comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others; pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; flashing the signal light and stopping the label at the button operating platform when the main controller detects a defect in the label, moving the label to the slitting mechanism after processing the label with the defect;

slitting the label into two parts or more parts by the slitting mechanism according to equipment parameters set;

installing the label strip at the second rolling airshaft or the first rolling airshaft after the first rolling airshaft or the second rolling airshaft collects all labels; swapping positions of the second rolling airshaft and the first rolling airshaft via rotation of a rolling drive device.

In the control method for the multifunctional automatic quality inspection machine described above, the roll-type printing product is mounted on the unrolling device; a label strip sequentially passes the first corrector, the inspection mechanism, the first traction device, the button operating platform, the second corrector, the second traction device, and the slitting mechanism along the guiding roller in the paper movement route; and the label strip is installed at the first rolling airshaft or the second rolling airshaft. By setting equipment parameters in the human-computer operating system, automatic feeding, automatic correction, automatic inspection, the removal of defective roll-type printing products, automatic slitting, and automatic material collection can be carried out easily and without extensive manual operation. Furthermore, when the main controller detects a defective roll-type printing product, the signal light flashes to inform the operator and to stop the label at the button operating platform. This eliminates the need for continuous attention from the operator. In addition, after the first rolling airshaft or the second rolling airshaft collects all the labels, the rolling drive device swaps the positions of the second rolling airshaft and the first rolling airshaft for quick material replacement. As a result, the multifunctional automatic quality inspection machine is highly automatic, efficient, accurate, has a number of functions, and is easy to operate.

REFERENCE NUMERALS

1—frame; 2—unrolling device; 3—inspection mechanism; 4—button operating platform; 5—slitting mechanism; 501—upper cutter shaft; 502—slitting upper cutter; 503—lower cutter shaft; 504—slitting lower cutter; 6—display device; 7—rolling device; 8—paper movement route; 9—guiding roller; 10—first rolling airshaft; 11—second rolling airshaft; 12—first traction device; 13—second traction device; 14—first corrector; 15—second corrector; 16—human-computer operating system; 17—signal light.

DETAILED DESCRIPTION OF THE ILLUSTRATED EMBODIMENTS

The technical solutions in the embodiments of the present invention are clearly and completely described hereafter with reference to the accompanying drawings and the embodiments of the present invention. It is obvious that the described embodiments are only some of the possible embodiments of the present invention. All other embodiments obtained by those skilled in the art based on the embodiments of the present invention without creative efforts are within the scope of the present invention.

Figure 1:
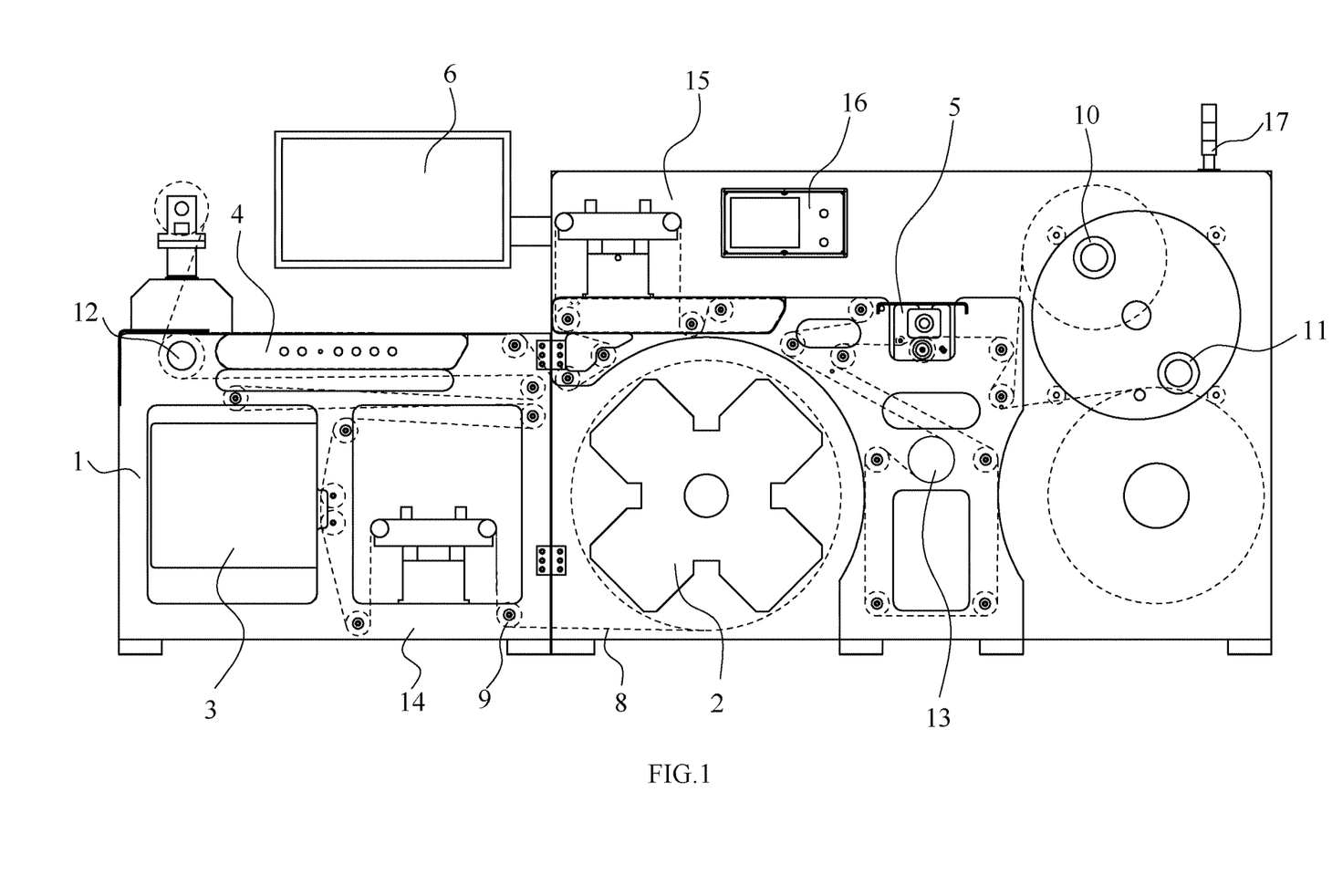
FIG. 1 is a schematic diagram of a multifunctional automatic quality inspection machine according to an embodiment of the present invention.

FIG. 1 illustrates a preferred embodiment of the multifunctional automatic quality inspection machine. The machine includes a frame 1; the frame is provided with an unrolling device 2, an inspection mechanism 3, a button operating platform 4, a slitting mechanism 5, a main controller, a display device 6 and a rolling device 7; the button operating platform 4 is used to remove defective roll-type printing products. A paper movement route 8 is provided between the unrolling device 2 and the rolling device 7. The inspection mechanism 3, the button operating platform 4, and the slitting mechanism 5 are provided at the paper movement route 8 along the paper movement direction. A number of guiding rollers 9 are provided along the paper movement route 8.

The inspection mechanism 3 includes a camera for photographing the roll-type printing products, a light source for assisting the camera, and a case; the camera and the light source are provided in the case. The case and the paper movement route 8 correspond to each other. The inspection mechanism 3 and the display device 6 are respectively electrically connected to the main controller. The rolling device 7 includes a first rolling airshaft 10, a second rolling airshaft 11, and a rolling drive device. The first rolling airshaft 10 and the second rolling airshaft 11 are both provided on the rolling drive device. The first rolling airshaft 10 and the second rolling airshaft 11 swap their positions via the rolling drive device.

In the multifunctional automatic quality inspection machine described above, the camera and the light source are provided in the case; the case and the paper movement route 8 correspond to each other; the inspection mechanism 3 and the display device 6 are electrically connected to the main controller respectively. Via these settings, the inspection mechanism 3 has a three-dimensional light source system, which gives rise to wider applications in defect detection. The first rolling airshaft 10 and the second rolling airshaft 11 are both provided on the rolling drive device; during material replacement, the first rolling airshaft 10 or the second rolling airshaft 11 can be installed with a paper core. The drive device allows swapping, which automatically transfers the second rolling airshaft 11 or the first rolling airshaft 10 to the position corresponding to the paper movement route 8. This allows quick material collection and quick replacement of roll-type printing products by the rolling device 7, increasing productivity. In addition, the frame 1 is sequentially provided with the unrolling device 2, the inspection mechanism 3, the button operating platform 4, the slitting mechanism 5, and the rolling device 7. The unrolling device 2 and the rolling device 7 could automatically unroll and roll. The inspection mechanism 3 could inspect at a high precision. The button operating platform 4 replaces defective roll-type printing products. The slitting mechanism 5 divides roll-type printing products into two parts or a number of parts. These features of the multifunctional automatic quality inspection machine bring a number of advantages including high automation level, high inspection precision, high inspection efficiency and multi-functional. The multifunctional automatic quality inspection machine removes the need for extensive manual operation and has high production efficiency. The camera of the present embodiment is a CCD camera. It continuously takes pictures of the roll-type printing products and transfers each frame of the pictures to the main controller. The main controller analyzes and processes image information through an image-processing software to identify pictures that indicates quality problems and to recognize the quality problem of the roll-type printing product corresponding to these pictures. Then, feedback information is transmitted to the display device 6 for further processing by the operator.

Furthermore, the rolling drive device includes a turntable and a motor; the motor is connected to the turntable and drives the turntable to rotate. The first rolling airshaft 10 and the second rolling airshaft 11 are respectively provided on the turntable. The first rolling airshaft 10 and the second rolling airshaft 11 swap their position via the rotation of the turntable driven by the motor. The working principle for such a position swap is simple: by turning the turntable clockwise or anticlockwise, the positions of the first rolling airshaft 10 and the second rolling airshaft 11 can be swapped. More specifically, the first rolling airshaft 10 and the second rolling airshaft 11 are symmetrically provided at two ends of a diameter of the turntable. The first rolling airshaft 10, the second rolling airshaft 11, and the center of the turntable are situated at the same horizontal line. By setting the motor to rotate 180 degrees clockwise or anticlockwise each time, the positions of the first rolling airshaft 10 and the second rolling airshaft 11 can be swapped. The working principle is simple and no sensors are required for connecting with the paper movement route 8. As a result, the number of components can be reduced and the equipment manufacturing cost can be reduced.

In addition, the turntable further includes a first air source switch electrically connected to the first rolling airshaft 10 and a second air source switch electrically connected to the second rolling airshaft 11. By providing the first air source switch and the second air source switch on the turntable, the first air source switch or the second air source switch can be pressed to quickly hold the paper core tightly after all material is collected, effectively increasing work efficiency.

Furthermore, the frame 1 is provided with a signal light 17 which is signally connected to the main controller. The signal light 17 allows prompt feedback of a defective electronic label or machine malfunction to the operator, greatly improving inspection precision and efficiency.

In addition, the frame 1 further includes a first traction device 12 and a second traction device 13. The first traction device 12 is disposed between the inspection mechanism 3 and the button operating platform 4. The second traction device 13 is disposed between the button operating platform 4 and the slitting mechanism 5. The first traction device 12 and the second traction device 13 lead the paper movement route and increase the tension of the paper in movement, ensuring the roll-type printing product moves smoothly along the paper movement route. The first traction device 12 includes a first traction shaft, a first paper pressing rubber roller, and a first cylinder which is connected to and drives the first paper pressing rubber roller. The first cylinder drives the first paper pressing rubber roller to be in contact with or move away from the first traction shaft. The second traction device 13 includes a second traction shaft, a second paper pressing rubber roller, and a second cylinder which is connected to and drives the second paper pressing rubber roller. The second cylinder drives the second paper pressing rubber roller to be in contact with or move away from the second traction shaft. The first cylinder and the second cylinder respectively drive the first paper pressing rubber roller and the second paper pressing rubber roller to press towards or move away from the first traction shaft and the second traction shaft. The roll-type printing product is pressed by the first traction device 12 and the second traction device 13, which are driven by pneumatic energy. The working principle is simple, and the coordination between the first paper pressing rubber roller, the second paper pressing rubber roller, the first traction shaft, and the second traction shaft can be effectively controlled to achieve automation.

In this embodiment, the frame 1 further includes a first corrector 14 and a second corrector 15. The first corrector 14 is disposed between the unrolling device 2 and the inspection mechanism 3. The second corrector 15 is disposed between the button operating platform 4 and the slitting mechanism 5. By providing the first corrector 14 and the second corrector 15 on the frame 1, the roll-type printing products can be corrected during the paper feeding process to keep the sides of the roll-type printing products aligned.

Optionally, the display device 6 is provided directly above the button operating platform 4. Defective printing products can be easily detected at the button operating platform 4 via the display device 6, improving the efficiency of defective product removal. In addition, the button operating platform 4 includes operation buttons which are electrically connected to the main controller. The machine can be quickly stopped, started, and any malfunction can be reported via the operation buttons.

To more conveniently set equipment parameters, the frame 1 further includes a human-computer operating system 16. The human-computer operating system 16 is electrically connected to the main controller. The equipment parameters can be quickly set via the human-computer operating system 16, effectively improving efficiency.

Figure 2:
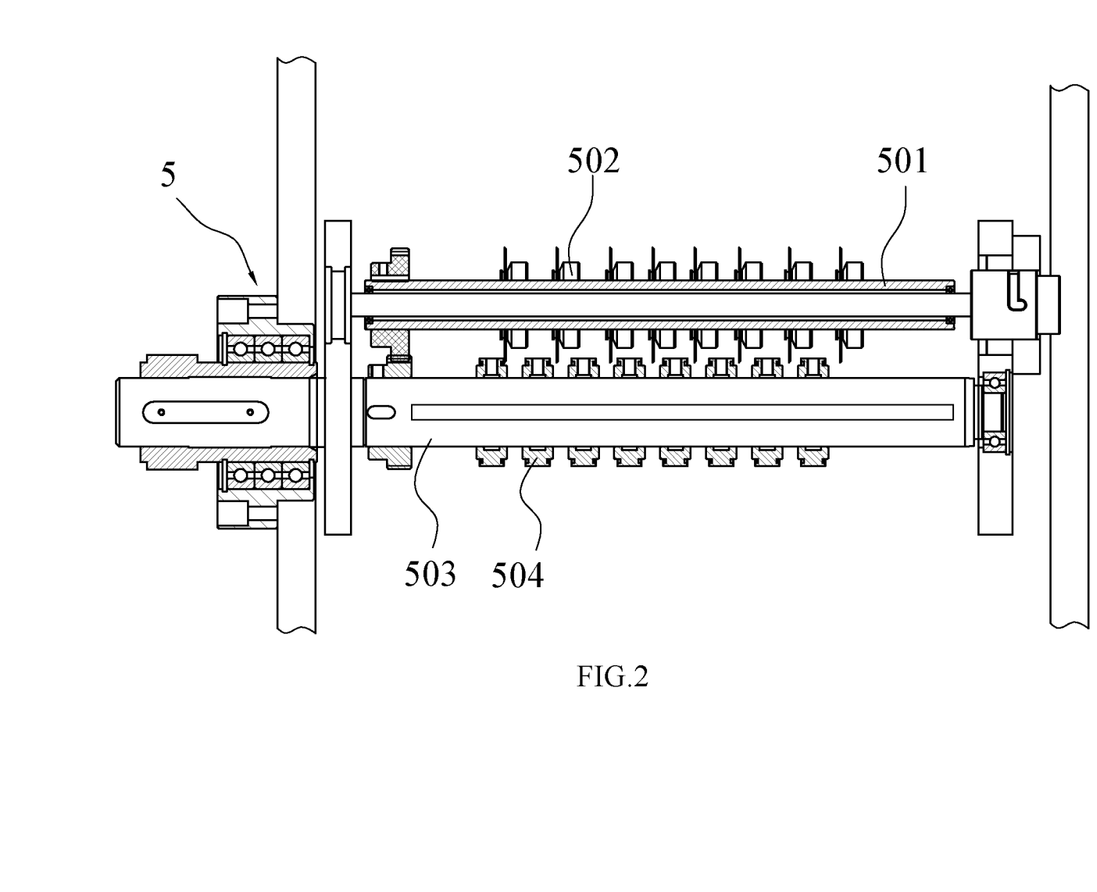
FIG. 2 is a schematic diagram of a slitting mechanism according to an embodiment of the present invention.

Referring to FIG. 2, the slitting mechanism 5 in the embodiment includes an incoming feed guiding roller, an upper cutter mechanism, a lower cutter mechanism, and an outgoing feed guiding roller. The upper cutter mechanism is located above the lower cutter mechanism. Both the upper cutter mechanism and the lower cutter mechanism have an eccentric self-locking structure. The incoming feed guiding roller and the outgoing feed guiding roller are provided on both sides of the upper cutter mechanism and the lower cutter mechanism; this arrangement allows the pressing of the roll-type printing product so that it could move past the upper cutter mechanism and lower cutter mechanism smoothly and steadily for slitting. Furthermore, the upper cutter mechanism includes an upper cutter shaft 501 and a slitting upper cutter 502; the lower cutter mechanism includes a lower cutter shaft 503, a slitting lower cutter 504, and a lower cutter motor which is connected to the lower cutter shaft 503 and drives its rotation. The lower cutter shaft 503 meshes with the upper cutter shaft 501; the lower cutter motor drives the lower cutter shaft 503 to rotate and to move close to or away from the upper cutter shaft 501; this arrangement allows the upper cutter mechanism and the lower cutter mechanism to simultaneously perform the slitting operation, which resembles the working of a pair of scissors. The slitting mechanism can quickly cut the roll-type printing product into two parts or a number of parts, effectively increasing efficiency.

The present embodiment further provides a control method for the multifunctional automatic quality inspection machine, which comprises the following steps:

installing a roll-type printing product at the unrolling device 2; allowing a label strip to sequentially pass the first corrector 14, the inspection mechanism 3, the first traction device 12, the button operating platform 4, the second corrector 15, the second traction device 13, and the slitting mechanism 5 along the guiding rollers 9 in the paper movement route; installing the label strip at the first rolling airshaft 10 or the second rolling airshaft 11;

setting equipment parameters in the human-computer operating system 16, the equipment parameters include paper movement speed, slitting function, traction tension, among others; pressing a start operation button at the button operating platform 4;

photographing a label to acquire an image by the camera which is assisted by the light source;

transmitting the image to the main controller by the inspection mechanism;

transmitting the image from the main controller to the display device 6 to analyze the image;

moving the label to the slitting mechanism 5 when the main controller detects that the label is free from defects;

flashing the signal light 17 and stopping the label at the button operating platform 4 when the main controller detects a defect in the label, moving the label to the slitting mechanism 5 after processing the label with a defect;

slitting the label into two parts or more parts by the slitting mechanism 5 according to the equipment parameters set;

installing the label strip at the second rolling airshaft 11 or the first rolling airshaft 10 after the first rolling airshaft 10 or the second rolling airshaft 11 collects all the labels;

swapping positions of the second rolling airshaft 11 and the first rolling airshaft 10 via rotation of the rolling drive device.

In the control method for the multifunctional automatic quality inspection machine described above, the roll-type printing product is mounted on the unrolling device 2; a label strip sequentially passes the first corrector 14, the inspection mechanism 3, the first traction device 12, the button operating platform 4, the second corrector 15, the second traction device 13, and the slitting mechanism 5 along the guiding roller 9 in the paper movement route; and the label strip is installed at the first rolling airshaft 10 or the second rolling airshaft 11. By setting equipment parameters in the human-computer operating system 16, automatic feeding, automatic correction, automatic inspection, the removal of defective roll-type printing products, automatic slitting, and automatic material collection can be carried out easily and without extensive manual operation. Furthermore, when the main controller detects a defective roll-type printing product, the signal light 17 flashes to inform the operator and the label is stopped at the button operating platform 4. This eliminates the need for continuous attention from the operator. In addition, after the first rolling airshaft 10 or the second rolling airshaft 11 collects all the labels, the rolling drive device swaps the positions of the second rolling airshaft 11 and the first rolling airshaft 10 for quick material replacement. As a result, the multifunctional automatic quality inspection machine is highly automatic, efficient, accurate, has a number of functions, and is easy to operate.

It should be understood that the terms "first", "second", and the like are used in the present invention to describe various information, but the information should not be limited to these terms, and these terms are only used to distinguish the same type of information from each other. For example, without departing from the scope of the invention, the "first" information may also be referred to as the "second" information; similarly, the "second" information may also be referred to as the "first" information.

The above is only a preferred embodiment of the present invention. It should be noted that those skilled in the art can make improvements and substitutions without departing from the technical principles of the present invention. These improvements and substitutions should also be considered as within the scope of protection of the present invention.

What is claimed is:

1. A multifunctional automatic quality inspection machine, wherein it comprises a frame, an unrolling device provided at the frame, an inspection mechanism, a button operating platform for removing a defective roll-type printing product, a slitting mechanism, a main controller, a display device, and a rolling device; a paper movement route is provided between the unrolling device and the rolling device; the inspection mechanism, the button operating platform, and the slitting mechanism are provided at the paper movement route along a paper movement direction; a number of guiding rollers are provided along the paper movement route;

the inspection mechanism includes a camera for photographing a roll-type printing product, a light source for assisting the camera, and a case; the camera and the light source are provided in the case; the case and the paper movement route correspond to each other; the inspection mechanism and the display device are respectively electrically connected to the main controller; the rolling device includes a first rolling airshaft, a second rolling airshaft, and a rolling drive device; the first rolling airshaft and the second rolling airshaft are both provided on the rolling drive device; the first rolling airshaft and the second rolling airshaft swap their positions via the rolling drive device.

2. The multifunctional automatic quality inspection machine according to claim 1, wherein the rolling drive device includes a turntable and a motor; the motor is connected to the turntable and drives the turntable to rotate; the first rolling airshaft and the second rolling airshaft are respectively provided on the turntable; the first rolling airshaft and the second rolling airshaft swap their position via rotation of the turntable driven by the motor.

3. The multifunctional automatic quality inspection machine according to claim 2, wherein the first rolling airshaft and the second rolling airshaft are symmetrically provided at two ends of a diameter of the turntable.

4. The multifunctional automatic quality inspection machine according to claim 2, wherein the turntable further includes a first air source switch electrically connected to the first rolling airshaft and a second air source switch electrically connected to the second rolling airshaft.

5. The multifunctional automatic quality inspection machine according to claim 1, wherein the slitting mechanism includes an incoming feed guiding roller, an upper cutter mechanism, a lower cutter mechanism, and an outgoing feed guiding roller; the upper cutter mechanism is located above the lower cutter mechanism; both the upper cutter mechanism and the lower cutter mechanism have an eccentric self-locking structure; the incoming feed guiding roller and the outgoing feed guiding roller are provided on both sides of the upper cutter mechanism and the lower cutter mechanism.

6. The multifunctional automatic quality inspection machine according to claim 5, wherein the upper cutter mechanism includes an upper cutter shaft and a slitting upper cutter; the lower cutter mechanism includes a lower cutter shaft, a slitting lower cutter, and a lower cutter motor which is connected to the lower cutter shaft and drives rotation of the lower cutter shaft; the lower cutter shaft meshes with the upper cutter shaft; the lower cutter motor drives the lower cutter shaft to rotate and to move close to or away from the upper cutter shaft.

7. The multifunctional automatic quality inspection machine according to claim 1, wherein the frame further includes a first traction device and a second traction device; the first traction device is disposed between the inspection mechanism and the button operating platform; the second traction device is disposed between the button operating platform and the slitting mechanism.

8. The multifunctional automatic quality inspection machine according to claim 7, wherein the first traction device includes a first traction shaft, a first paper pressing rubber roller, and a first cylinder which is connected to and drives the first paper pressing rubber roller; the first cylinder drives the first paper pressing rubber roller to be in contact with or move away from the first traction shaft; the second traction device includes a second traction shaft, a second paper pressing rubber roller, and a second cylinder which is connected to and drives the second paper pressing rubber roller; the second cylinder drives the second paper pressing rubber roller to be in contact with or move away from the second traction shaft.

9. The multifunctional automatic quality inspection machine according to claim 1, wherein the frame further includes a first corrector and a second corrector; the first corrector is disposed between the unrolling device and the inspection mechanism; the second corrector is disposed between the button operating platform and the slitting mechanism.

10. The multifunctional automatic quality inspection machine according to claim 1, wherein the display device is provided directly above the button operating platform.

11. The multifunctional automatic quality inspection machine according to claim 10, wherein the button operating platform includes an operation button which is electrically connected to the main controller.

12. The multifunctional automatic quality inspection machine according to claim 1, wherein the frame further comprises a human-computer operating system; the human-computer operating system is electrically connected to the main controller.

13. The multifunctional automatic quality inspection machine according to claim 1, wherein the frame is provided with a signal light which is signally connected to the main controller.

14. A control method for the multifunctional automatic quality inspection machine according to claim 1, wherein it comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others; pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; flashing the signal light and stopping the label at the button operating platform when the main controller detects a defect in the label, moving the label to the slitting mechanism after processing the label with the defect;

slitting the label into two parts or more parts by the slitting mechanism according to equipment parameters set;

installing the label strip at the second rolling airshaft or the first rolling airshaft after the first rolling airshaft or the second rolling airshaft collects all labels; swapping positions of the second rolling airshaft and the first rolling airshaft via rotation of a rolling drive device.

15. A control method for the multifunctional automatic quality inspection machine according to claim 2, wherein it comprises the following steps:
    installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;
    setting equipment parameters in a human-computer operating system, the equipment parameters include paper movement speed, slitting function, traction tension, among others; pressing a start operation button at the button operating platform;
    photographing a label to acquire an image by a camera which is assisted by a light source;
    transmitting the image to the main controller by the inspection mechanism;
    transmitting the image from the main controller to a display device to analyze the image;
    moving the label to the slitting mechanism when the main controller detects that the label is free from defects; flashing the signal light and stopping the label at the button operating platform when the main controller detects a defect in the label, moving the label to the slitting mechanism after processing the label with the defect;
    slitting the label into two parts or more parts by the slitting mechanism according to equipment parameters set;
    installing the label strip at the second rolling airshaft or the first rolling airshaft after the first rolling airshaft or the second rolling airshaft collects all labels; swapping positions of the second rolling airshaft and the first rolling airshaft via rotation of a rolling drive device.

16. A control method for the multifunctional automatic quality inspection machine according to claim 3, wherein it comprises the following steps:
    installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;
    setting equipment parameters in a human-computer operating system, the equipment parameters include paper movement speed, slitting function, traction tension, among others; pressing a start operation button at the button operating platform;
    photographing a label to acquire an image by a camera which is assisted by a light source;
    transmitting the image to the main controller by the inspection mechanism;
    transmitting the image from the main controller to a display device to analyze the image;
    moving the label to the slitting mechanism when the main controller detects that the label is free from defects; flashing the signal light and stopping the label at the button operating platform when the main controller detects a defect in the label, moving the label to the slitting mechanism after processing the label with the defect;
    slitting the label into two parts or more parts by the slitting mechanism according to equipment parameters set;
    installing the label strip at the second rolling airshaft or the first rolling airshaft after the first rolling airshaft or the second rolling airshaft collects all labels; swapping positions of the second rolling airshaft and the first rolling airshaft via rotation of a rolling drive device.

17. A control method for the multifunctional automatic quality inspection machine according to claim 4, wherein it comprises the following steps:
    installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;
    setting equipment parameters in a human-computer operating system, the equipment parameters include paper movement speed, slitting function, traction tension, among others; pressing a start operation button at the button operating platform;
    photographing a label to acquire an image by a camera which is assisted by a light source;
    transmitting the image to the main controller by the inspection mechanism;
    transmitting the image from the main controller to a display device to analyze the image;
    moving the label to the slitting mechanism when the main controller detects that the label is free from defects; flashing the signal light and stopping the label at the button operating platform when the main controller detects a defect in the label, moving the label to the slitting mechanism after processing the label with the defect;
    slitting the label into two parts or more parts by the slitting mechanism according to equipment parameters set;
    installing the label strip at the second rolling airshaft or the first rolling airshaft after the first rolling airshaft or the second rolling airshaft collects all labels; swapping positions of the second rolling airshaft and the first rolling airshaft via rotation of a rolling drive device.

18. A control method for the multifunctional automatic quality inspection machine according to claim 5, wherein it comprises the following steps:
    installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;
    setting equipment parameters in a human-computer operating system, the equipment parameters include paper movement speed, slitting function, traction tension, among others; pressing a start operation button at the button operating platform;
    photographing a label to acquire an image by a camera which is assisted by a light source;
    transmitting the image to the main controller by the inspection mechanism;

transmitting the image from the main controller to a display device to analyze the image;

moving the label to the slitting mechanism when the main controller detects that the label is free from defects; flashing the signal light and stopping the label at the button operating platform when the main controller detects a defect in the label, moving the label to the slitting mechanism after processing the label with the defect;

slitting the label into two parts or more parts by the slitting mechanism according to equipment parameters set;

installing the label strip at the second rolling airshaft or the first rolling airshaft after the first rolling airshaft or the second rolling airshaft collects all labels; swapping positions of the second rolling airshaft and the first rolling airshaft via rotation of a rolling drive device.

19. A control method for the multifunctional automatic quality inspection machine according to claim 6, wherein it comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others; pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; flashing the signal light and stopping the label at the button operating platform when the main controller detects a defect in the label, moving the label to the slitting mechanism after processing the label with the defect;

slitting the label into two parts or more parts by the slitting mechanism according to equipment parameters set;

installing the label strip at the second rolling airshaft or the first rolling airshaft after the first rolling airshaft or the second rolling airshaft collects all labels; swapping positions of the second rolling airshaft and the first rolling airshaft via rotation of a rolling drive device.

20. A control method for the multifunctional automatic quality inspection machine according to claim 7, wherein it comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others; pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; flashing the signal light and stopping the label at the button operating platform when the main controller detects a defect in the label, moving the label to the slitting mechanism after processing the label with the defect;

slitting the label into two parts or more parts by the slitting mechanism according to equipment parameters set;

installing the label strip at the second rolling airshaft or the first rolling airshaft after the first rolling airshaft or the second rolling airshaft collects all labels; swapping positions of the second rolling airshaft and the first rolling airshaft via rotation of a rolling drive device.

* * * * *